United States Patent
Velhal et al.

(10) Patent No.: US 7,245,258 B2
(45) Date of Patent: Jul. 17, 2007

(54) LOCATION PROCESSING APPARATUS, SYSTEMS, AND METHODS

(75) Inventors: Ravindra V. Velhal, Beaverton, OR (US); Jeetendra G. Deshmukh, Beaverton, OR (US); Nikhil M. Deshpande, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 244 days.

(21) Appl. No.: 10/877,258

(22) Filed: Jun. 25, 2004

(65) Prior Publication Data

US 2005/0285789 A1 Dec. 29, 2005

(51) Int. Cl.
 G01S 3/02 (2006.01)
(52) U.S. Cl. ..................................... 342/451
(58) Field of Classification Search ............... 342/451, 342/450; 701/208
 See application file for complete search history.

(56) References Cited

U.S. PATENT DOCUMENTS

| | | | |
|---|---|---|---|
| 6,178,468 B1 | 1/2001 | Rudd et al. | |
| 6,687,820 B2 | 2/2004 | French et al. | |
| 6,963,981 B1 | 11/2005 | Bailey et al. | |
| 7,039,520 B2 * | 5/2006 | Draeger et al. | 701/211 |
| 7,054,947 B2 | 5/2006 | Yun | |
| 2001/0009427 A1 | 7/2001 | Kaneko et al. | |
| 2003/0100339 A1 | 5/2003 | Chen, et al. | |
| 2004/0039523 A1 | 2/2004 | Kainuma et al. | |
| 2006/0132307 A1 | 6/2006 | Velhal et al. | |
| 2006/0272020 A1 * | 11/2006 | Gardner | |

FOREIGN PATENT DOCUMENTS

| | | |
|---|---|---|
| EP | 1273721 A1 | 1/2003 |
| JP | 62-261012 | 11/1987 |
| JP | 2002-350145 | 12/2002 |
| WO | WO-97/24584 A1 | 7/1997 |

OTHER PUBLICATIONS

"International Search Report for corresponding PCT Application No. PCT/US2005/019883", (Aug. 11, 2005), 5 pgs.
"Extensible Firmware Interface", *Available at* http://www.intel.com/technology/efi/, 2 pages.
Sun, Jiming, "Case Study: Enhancing Pre-Boot Environment with EFI Applications", *Intel Developer Forum, Sep. 9-12, 2002*, Available at http://cnscenter.future.co.kr/resource/rsc-center/presentation/intel/fall2002/EFI092PS.pdf,(Sep. 9, 2002), 19 pages.

* cited by examiner

*Primary Examiner*—Thomas H. Tarcza
*Assistant Examiner*—F H Mull
(74) *Attorney, Agent, or Firm*—Schwegman, Lundberg, Woessner & Kluth, P.A.

(57) ABSTRACT

Apparatus, systems, and methods may provide operating system-independent geolocation information. A compact software and/or firmware environment may be established prior to loading and/or initializing the main operating system. This environment, sometimes known as a pre-boot environment, may determine geolocation information and/or may provide user access to configuration information and methods, even when the operating system is absent or unavailable.

27 Claims, 3 Drawing Sheets

LOCATION PROCESSING APPARATUS, SYSTEMS, AND METHODS

TECHNICAL FIELD

Various embodiments described herein relate to information processing generally, including apparatus, systems, and methods for geolocation information processing.

BACKGROUND INFORMATION

Geolocation information may be acquired, processed, and displayed according to various methods. Examples may include, but are not limited to, global positioning system ("GPS") receivers and other systems employing, for example, triangulation based upon precise timing, signal strengths, and/or other parameters associated with radio frequency signals received from multiple reference sites. Such geolocation receivers and systems may employ software operating systems to control hardware to acquire and/or process the geolocation information, and may suffer from loss of the geolocation information when the operating system is unavailable and/or incapable of acquiring and/or determining geolocation.

DETAILED DESCRIPTION

Various embodiments disclosed herein address some of the challenges of providing operating system-independent geolocation information. In some embodiments, a compact software and/or firmware environment may be established prior to loading and/or initializing the main operating system. This environment, sometimes known as a pre-boot environment, may determine geolocation information and/or provide user access to configuration information and methods when the operating system is absent or unavailable.

Figure 1:
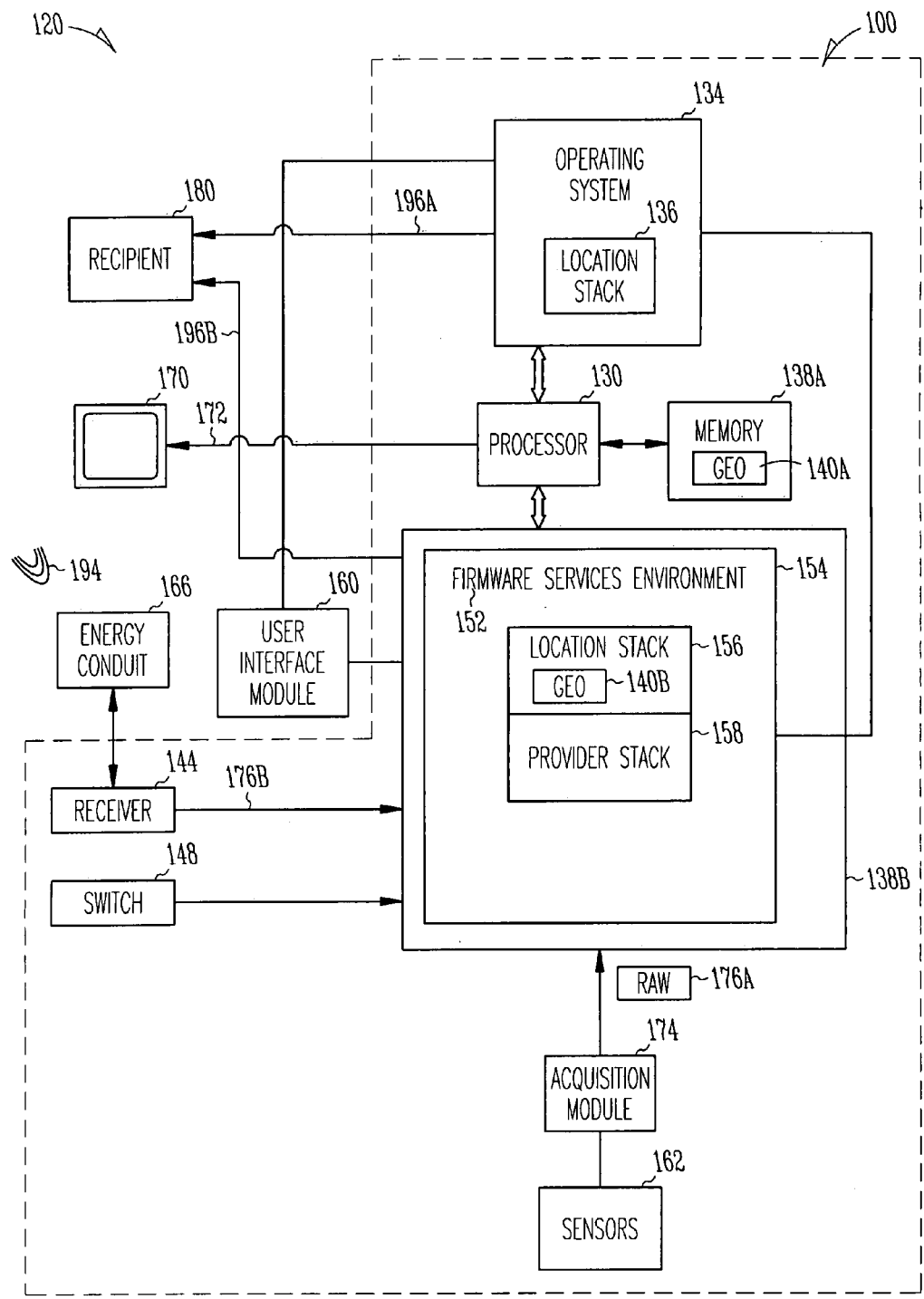
FIG. 1 is a block diagram of an apparatus and a system according to various embodiments of the invention.

FIG. 1 is a block diagram of an apparatus 100 and a system 120 according to various embodiments of the invention, each of which may operate in the manner described above. For example, the apparatus 100 may include a processor 130 to couple to an operating system 134, which may optionally include a location stack 136. A "location stack" may include a memory to hold a set of geolocation data, and/or receive and/or process a set of sensor data. "Geolocation data" and/or "geolocation information" may include information relating a physical position of an object to a position of another object, or an absolute position relative to a grid. "Sensor data" may include any parameters from which geolocation information may be calculated or derived.

In some embodiments of the apparatus 100, a processor 130 may determine operating system independent geolocation information, and/or may be coupled to a memory 138A and/or 138B, which may store operating system-independent geolocation information 140A and/or 140B. "Operating system-independent" with reference to systems, apparatus, information, and/or methods includes those that are capable of existing and/or performing a function during a period when the operating system is absent or unavailable. Operating system independent geolocation information may be determined, for example, by calculation, table look-up, and/or other methods known to those skilled in the art. In some embodiments of the apparatus 100, the memory 138A and/or 138B may be included in one or more of a cellular telephone, a personal digital assistant, and a computer.

Some embodiments of the apparatus 100 may include an acquisition module 174 to couple to the memory 138A and/or 138B and to provide a set of sensor data 176A and/or 176B to the memory 138A and/or 138B. Some embodiments of the apparatus 100 may include a receiver 144 to receive the set of sensor data 176A and/or 176B. Some embodiments of the apparatus 100 may include a switch 148 to initiate collection of, calculation of, storage of, and/or access to the operating system-independent geolocation information 140A and/or 140B.

Some embodiments of the apparatus 100 may include a module 154 to communicate the operating system-independent geolocation information 140A and/or 140B to an operating system 134. In some embodiments of the apparatus 100, the module 154 and/or the operating system 134 may communicate operating system-independent geolocation information 196A and/or 196B to an operating system-independent geolocation information recipient 180. An "operating system-independent geolocation information recipient" may include a network or another device, for example.

In some embodiments of the apparatus 100, the module 154 may include a firmware services environment 152. A "firmware services environment" may include hardware and/or software resources made available prior to, during, and/or after loading the operating system, and results derived therefrom. The module 154 may optionally include a location stack 156 and/or a provider stack 158. A "provider stack" may include a memory to hold information associated with sources of a set of sensor data. Other embodiments may be realized. For example, in some embodiments of the apparatus 100, the provider stack 158 may include a plurality of sensors 162 to acquire a set of sensor data 176A and/or 176B.

In some embodiments, a system 120 may include one or more of an apparatus 100 similar or identical to that previously described, as well as a user interface module 160 coupled to a module 154 and/or to an operating system 134, an energy conduit 166 coupled to a receiver 144, a display 170 coupled (directly or indirectly) to a processor 130, and/or an operating system-independent geolocation information recipient 180 coupled to the module 154 and/or to an operating system 134.

Some embodiments of the system 120 may include a processor 130 coupled to an operating system 134 to determine operating system-independent geolocation information 140A and/or 140B, a memory 138A and/or 138B coupled to the processor 130 to store the operating system-independent geolocation information 140A and/or 140B, and/or a display 170 to display data 172 associated with the operating system-independent geolocation information 140A and/or 140B. In some embodiments of the system 120, the display 170 may present the operating system-independent geolocation information 140A and/or 140B visually, aurally, and/or mechanically.

Some embodiments of the system 120 may utilize a module 154 to store the operating system-independent geolocation information 140A and/or 140B and/or to communicate the operating system-independent geolocation information 140A and/or 140B to an operating system 134.

In some embodiments of the system 120, the module 154 may be a firmware services environment 152. In some embodiments, the system 120 may include an operating system-independent geolocation information recipient 180, coupled to the module 154 and/or to the operating system 134, to receive a set of geolocation data 196A and/or 196B. An "operating system-independent geolocation information recipient" may include a network and/or another device, for example.

In some embodiments of the system 120, an acquisition module 174 may be coupled to a memory 138A and/or 138B to provide a set of sensor data 176A and/or 176B to the memory 138A and/or 138B. It should be noted that in some embodiments of the system 120, the acquisition module 174 may exist independently from the apparatus 100. In other embodiments of system 120, the acquisition module 174 may be included in the apparatus 100.

In some embodiments, the system 120 may include a user interface module 160 to acquire user preferences associated with determining and/or accessing the operating system-independent geolocation information 140A and/or 140B. In some embodiments of the system 120, the user interface module 160 may be used to acquire user preferences associated with providers of a set of sensor data 176A and/or 176B. In some embodiments of the system 120, an energy conduit 166 may receive a set of geolocation signals 194. A "geolocation signal" may include any characteristic of radio frequency energy and/or electromagnetic energy from which geolocation information may be calculated or derived. An "energy conduit" 166 may include an antenna, including patch, omnidirectional, beam, monopole, dipole, and rhombic antennas, among others.

Some embodiments of the system 120 may be implemented as part of a wireless system, including those using multi-carrier wireless communication channels (e.g., orthogonal frequency-division multiplexing (OFDM), discrete multi-tone modulation (DMT), etc.), such as may be used within, without limitation, a wireless personal area network (WPAN), a wireless local area network (WLAN), a wireless metropolitan area network (WMAN), a wireless wide area network (WWAN), a cellular network, a third generation (3G) network, a fourth generation (4G) network, a universal mobile telephone system (UMTS), and like communication systems.

The apparatus 100, system 120, processor 130, operating system 134, location stack 136, memories 138A, 138B, operating system-independent geolocation information 140A, 140B, receiver 144, switch 148, firmware services environment 152, module 154, location stack 156, provider stack 158, user interface module 160, energy conduit 166, display 170, acquisition module 174, sensor data 176A, 176B, geolocation information recipient 180, geolocation data 196A, 196B, and geolocation signals 194 may all be characterized as "modules" herein. Such modules may include hardware circuitry, and/or a processor and/or memory circuits, software program modules and objects, and/or firmware, and combinations thereof, as desired by the architect of the apparatus 100 and systems 120, and as appropriate for particular implementations of various embodiments. For example, such modules may be included in a system operation simulation package, such as a software electrical signal simulation package, a power usage and distribution simulation package, a capacitance-inductance simulation package, a power/heat dissipation simulation package, a signal transmission-reception simulation package, and/or a combination of software and hardware used to simulate the operation of various potential embodiments.

It should also be understood that the apparatus and systems of various embodiments may be used in applications other than for mobile wireless devices, and thus, various embodiments are not to be so limited. The illustrations of apparatus 100 and system 120 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal-processing circuitry, modems, processor modules, embedded processors, data switches, and application-specific modules, including multilayer, multi-chip modules. Such apparatus and systems may further be included as sub-components within a variety of electronic systems, such as televisions, cellular telephones, personal computers, workstations, servers, radios, video players, vehicles, and others. Some embodiments include a number of methods.

Figure 2:
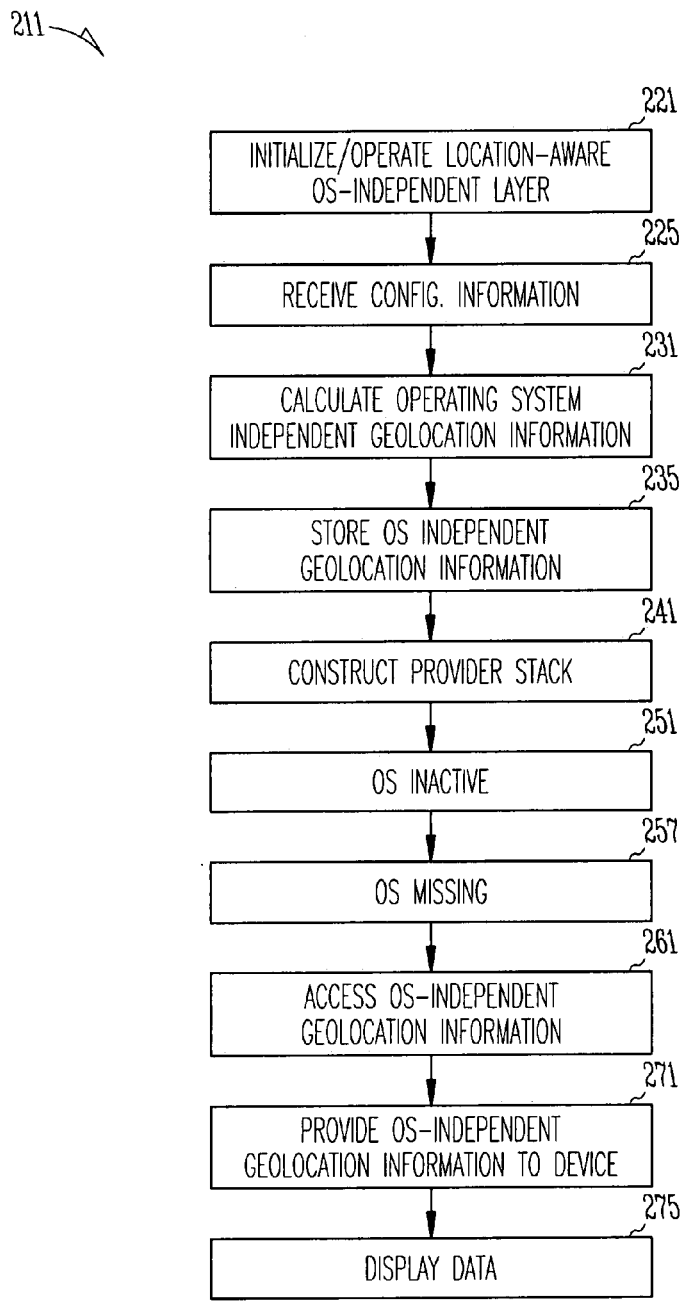
FIG. 2 is a flow diagram illustrating several methods according to various embodiments of the invention.

For example, FIG. 2 is a flow diagram illustrating several methods 211 according to various embodiments. For example, a method 211 may (optionally) begin at block 221 with initializing and operating a location-aware, operating system-independent firmware layer in a device having an operating system. In some embodiments, the method 211 may include receiving configuration information associated with access to operating system-independent geolocation information prior to, during, and/or after loading an operating system at block 225.

The method 211 may then include calculating the operating system-independent geolocation information at block 231. In some embodiments, the method 211 at block 231 may include combining a set of sensor data received from a plurality of providers into aggregated geolocation data, and/or calculating the aggregated geolocation data from the set of sensor data. In some embodiments, the method 211 may include storing the operating system-independent geolocation information in a location stack in an operating system-independent accessible interface at block 235. An "operating system-independent accessible interface" may include a conduit for passing information that may be active prior to, during, and/or after loading the operating system. Some embodiments of the method 211 may include constructing a provider stack, including information related to a plurality of sensor data set providers at block 241.

In some embodiments, the method 211 may include the operating system becoming inactive, inaccessible, inoperable, and/or missing at block 251, perhaps by placing the operating system in a standby mode and/or in a hibernate mode. "Hibernate mode," may include saving a memory state to a disk prior to a system shutdown, for subsequent restoration of the memory state. The method 211 may include the operating system being removed at block 257.

The method 211 may include collecting, calculating, storing, and/or accessing geolocation information stored in an operating system-independent firmware layer at block 261, perhaps in response to switch activation prior to, after, and/or during loading the operating system, or at configurable intervals, for example. Some embodiments of the method 211 may include providing the operating system-independent geolocation information to a device including an operating system at block 271. Some embodiments of method 211 may include displaying location data associated with the aggregated geolocation data on a display after loading an operating system at block 275.

It should be noted that the methods described herein may not have to be executed in the order described, or in any particular order. Moreover, various activities described with respect to the methods identified herein may be executed in serial or parallel fashion. Information, including parameters, commands, operands, and other data, may be sent and received in the form of one or more carrier waves.

Upon reading and comprehending the content of this disclosure, one of ordinary skill in the art will understand the manner in which a software program may be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs may be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment. Thus, other embodiments may be realized.

Figure 3:
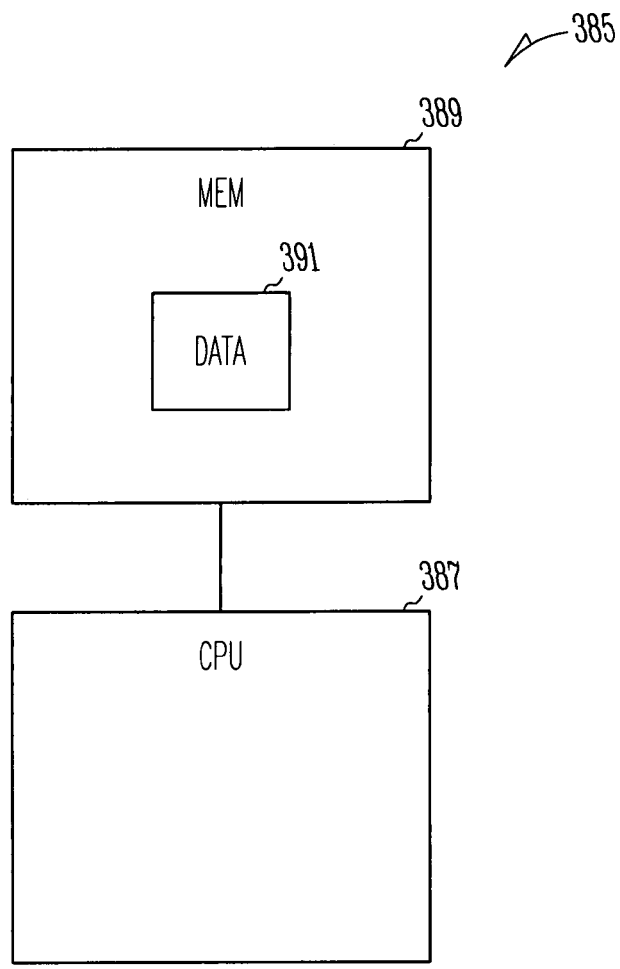
FIG. 3 is a block diagram of an article according to various embodiments of the invention.

FIG. 3 is a block diagram of an article 385 according to various embodiments, such as a computer, a memory system, a magnetic or optical disk, some other storage device, and/or any type of electronic device or system. The article 385 may include a processor 387 coupled to a machine-accessible medium such as a memory 389 (e.g., a memory including an electrical, optical, or electromagnetic conductor) having associated information 391 (e.g., computer program instructions and/or data), which, when accessed, results in a machine (e.g., the processor 387) performing such actions as providing operating system-independent geolocation information to a device including an operating system.

Other activities may include combining a set of sensor data received from a plurality of providers into aggregated geolocation data. Further activities may include displaying location data associated with the aggregated geolocation data on a display after loading an operating system. Some activities may include mechanically indicating and/or aurally alerting according to a state of the aggregated geolocation data after loading the operating system. Some activities may include receiving configuration information associated with calculating, collecting, storing, and/or accessing the operating system-independent geolocation information prior to, during, and/or after loading the operating system.

Implementing the apparatus, systems, and methods described herein may provide continued availability of geolocation information and/or the mechanisms to configure geolocation parameters and/or geolocation provider parameters during periods when the operating system is missing or unavailable.

The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, including:

a processor coupled to an operating system to execute the operating system and to determine operating system-independent geolocation information; and an operating system-independent geolocation stack in a firmware services environment, the operating system-independent geolocation stack coupled to the processor to continue to provide at least one of the operating system-independent geolocation information or a set of sensor data at a time when a status associated with the operating system comprises at least one of missing, inaccessible, or inoperable.

2. The apparatus of claim 1, further including:

an acquisition module to couple to the memory and to provide the set of sensor data to the operating system-independent geolocation stack in the firmware services environment.

3. The apparatus of claim 2, further including:

a receiver to receive the set of sensor data.

4. The apparatus of claim 1, wherein the operating system-independent geolocation stack in the firmware services environment is included in at least one of a cellular telephone, a personal digital assistant, or a computer.

5. The apparatus of claim 1, further including:

a switch to initiate access to the operating system-independent geolocation information.

6. The apparatus of claim 1, further including:

a module to communicate the operating system-independent geolocation information to at least one of the operating system, a network, or a wireless computation platform.

7. A system, including:

a processor coupled to an operating system to execute the operating system and to determine operating system-independent geolocation information;

an operating system-independent geolocation stack in a firmware services environment, the operating system-independent geolocation stack coupled to the processor to continue to provide at least one of the operating system-independent geolocation information or a set of sensor data at a time when a status associated with the operating system comprises at least one of missing, inaccessible, or inoperable; and a display operatively coupled to the processor to display data associated with the operating system-independent geolocation information.

8. The system of claim 7, further including:

an acquisition module to couple to the operating system-independent geolocation stack in the firmware services environment to provide a set of sensor data to the operating system-independent geolocation stack in the firmware services environment.

9. The system of claim 8, further including:

a user interface module operatively coupled to the operating system-independent geolocation stack in the firmware services environment to acquire user preferences associated with access to the operating system-independent geolocation information during at least one of a time period prior to loading the operating system, a time period while loading the operating system, or a time period after loading the operating system.

10. The system of claim 9, wherein the user interface module is adapted to acquire user preferences associated with a plurality of providers of the set of sensor data.

11. The system of claim 8, further including:

an omnidirectional antenna operatively coupled to the acquisition module to receive a set of geolocation signals.

12. The system of claim 7, further including:

a firmware services environment module operatively coupled to the processor to store the operating system-independent geolocation information and to communicate the operating system-independent geolocation information to at least one of the operating system or an operating system-independent geolocation information recipient.

13. A method, including:

providing operating system-independent geolocation information to a device, wherein the device includes an operating system, at a time when a status associated with the operating system comprises at least one of missing, inaccessible, or inoperable.

14. The method of claim 13, further including:

calculating the operating system-independent geolocation information from a set of sensor data.

15. The method of claim 13, further including:

storing the operating system-independent geolocation information in a location stack in an operating system-independent accessible interface.

16. The method of claim 13, further including:

accessing the operating-system-independent geolocation information prior to loading the operating system.

17. The method of claim 13, further including:

accessing the operating system-independent geolocation information responsive to a switch activation after loading the operating system.

18. A method, including:

operating a location-aware, operating system-independent firmware layer in a device having an operating system, wherein the operating system-independent firmware layer is capable of providing operating system-independent geolocation information to the device at a time when a status associated with the operating system comprises at least one of missing, inaccessible, or inoperable.

19. The method of claim 18, further including:

accessing geolocation information stored in the operating system-independent firmware layer after the operating system has become inactive.

20. The method of claim 18, further including:

placing the operating system in a standby mode.

21. The method of claim 18, further including:

removing the operating system.

22. The method of claim 18, further including:

constructing a provider stack to include a plurality of geolocation information providers.

23. An article comprising a machine-accessible medium having associated information, wherein the information, when accessed, results in a machine performing:

providing operating system-independent geolocation information to a device, wherein the device includes an operating system, at a time when a status associated with the operating system comprises at least one of missing, inaccessible, or inoperable.

24. The article of claim 23, wherein the information, when accessed, results in the machine performing:

combining a set of sensor data received from a plurality of providers into aggregated geolocation data.

25. The article of claim 24 wherein the information, when accessed, results in the machine performing:

displaying location data associated with the aggregated geolocation data on a display after loading the operating system.

26. The article of claim 23, wherein the information, when accessed, results in the machine performing:

receiving configuration information associated with access to the operating system-independent geolocation information prior to loading the operating system.

27. The article of claim 23, wherein the information, when accessed, results in the machine performing:

receiving configuration information associated with access to the operating system-independent geolocation information after loading the operating system.

* * * * *

UNITED STATES PATENT AND TRADEMARK OFFICE
CERTIFICATE OF CORRECTION

PATENT NO. : 7,245,258 B2 Page 1 of 1
APPLICATION NO. : 10/877258
DATED : July 17, 2007
INVENTOR(S) : Velhal et al.

It is certified that error appears in the above-identified patent and that said Letters Patent is hereby corrected as shown below:

On the Title page, item (56), under "Other Publications", in column 2, line 3, delete "athttp:" and insert -- at http: --, therefor.

On the Title page, item (57), under "Abstract", in column 2, line 3, delete "firmwave" and insert -- firmware --, therefor.

In column 8, line 7, Claim 16, delete "operating-system-independent" and insert -- operating system-independent --, therefor.

Signed and Sealed this

Eighteenth Day of September, 2007

JON W. DUDAS
*Director of the United States Patent and Trademark Office*